United States Patent Office 3,015,019
Patented Dec. 26, 1961

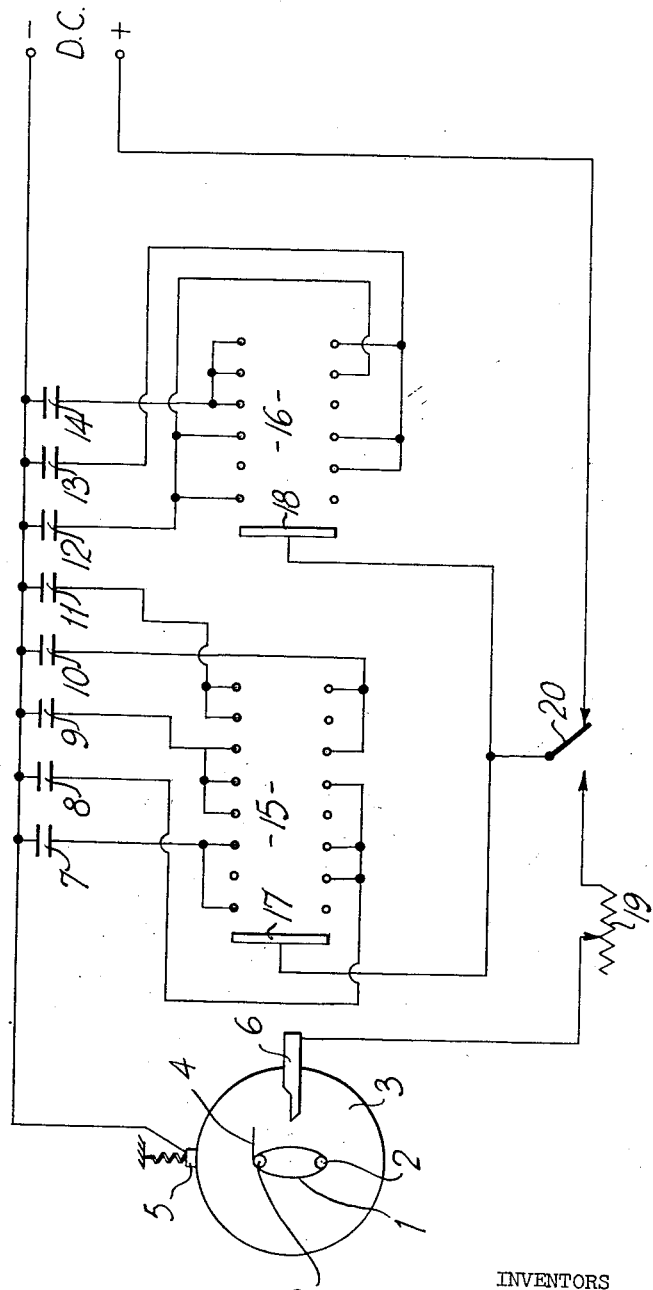

3,015,019
MANUFACTURE OF ELECTRONIC VALVES
Clayton Arbuthnot Lane, Enfield, and John Kay, Forty Hill, Enfield, England, assignors to Siemens Edison Swan Limited, London, England, a British company
Filed Mar. 3, 1959, Ser. No. 796,815
Claims priority, application Great Britain Mar. 6, 1958
7 Claims. (Cl. 219—68)

This invention relates to the manufacture of electronic valves particularly of the kind comprising a grid constituted by turns of wire supported by means of spaced apart metal rods for example.

In the manufacture of such grids by the so-called "break and re-feed" technique the grid wire may be wound onto a pair of parallel metal support rods for example by rotating the rods about an axis intermediate the rod axes and contained in the plane of the latter, the support rods being suitably nicked at intervals along their lengths for receiving the turns of grid wire which are retained within said nicks by swaging. When the requisite number of turns for a particular valve grid have been wound on to the rods the grid wire is severed and winding of the next grid is commenced utilising the same support rods, the final grid assembly being subsequently divided so as to provide a number of separate valve grids.

As the winding of each grid is commenced a loose end of grid wire or tag is left projecting laterally outwardly from the grid structure. Heretofore attempts have been made to remove these loose ends without interruption of the grid winding operation by causing a relatively heavy fusing current to be passed therethrough from a battery. The results, however, have generally proved unsatisfactory due to the sputtering of metal and the deposition of oxide onto the grid structure during vaporisation or fusion of the loose ends of grid wire. Furthermore, there is a marked tendency for these loose ends of wire to form into metal globules which attach themselves to the grid structure.

According to the present invention, in the manufacture of a valve grid of the character hereinbefore indicated by the so-called "break and re-feed" technique, one or more charged capacitors are discharged through each loose end of grid wire so as to fuse it as it engages with a suitably arranged electrode or the like during the grid winding operation.

By the use of a charged capacitor or capacitors as the source of electrical energy releasable to effect fusion of the loose ends of grid wire it has been found that sputtering of metal onto the grid structure and the other undesirable effects previously referred to are avoided. This is believed to be due to the fact that the fusing current decreases exponentially and that the total quantity of energy releasable to fuse the loose ends can be more accurately predetermined than with a battery.

The potential on the electrode prior to and at the time of its engagement by the loose end of grid wire is preferably relatively low so as to prevent an operator who touches said electrode from receiving severe electric shocks. This may conveniently be achieved where a number of capacitors are employed by charging the capacitors from a low voltage source and then discharging them in parallel through the loose end.

The discharge circuit for the capacitor or capacitors preferably includes a variable resistance so that the time constant of the discharge circuit can be varied in accordance with the time interval during which fusing of the loose end must take place (which is dependent inter alia upon the speed of rotation of the grid assembly) and the energy stored in the capacitor or capacitors to be discharged through said loose end.

If desired, selective switching means may be provided for selecting one or more capacitors, together providing the required total capacitance, from a group of capacitors.

The nature of the present invention will be better understood from the following description taken in conjunction with the accompanying drawing which shows diagrammatically by way of example apparatus for removing loose ends from valve grids produced by the "break and re-feed" technique.

Referring to the drawing, there is shown a diagrammatic end view of a valve grid formed by a number of turns of wire, the end turn of which is indicated at 1, wound onto a pair of parallel spaced apart metal rods 2 having nicks or the like (not shown) therein for receiving and retaining the grid wire. The rods 2 are secured to or carried by a lathe spindle 3 for example so as to extend axially therefrom as illustrated.

In producing the grid by the aforesaid technique the grid wire is severed by means not shown upon completion of each grid so that as winding of the next grid is commenced a loose end or tag 4 is left extending laterally outwardly from the grid structure as illustrated. The metal lathe spindle 3, and thus the whole grid structure is earthed by means of an earthed conductive brush 5 so that as the loose end 4 is carried round by the rotating rods 2 it engages with an electrode 6 thereby causing one or more charged capacitors to discharge therethrough to fuse said loose end in the manner now to be described.

In the arrangement illustrated a group of capacitors designated 7–14 inclusive having varying capacitances so that with suitable cross connections made between the fixed contact elements of a pair of selector switches 15 and 16, the bridging wipers or other movable switch contact elements diagrammatically represented at 17 and 18 may be moved to a position for selecting the desired total capacitance to be charged and then discharged to fuse the loose end 4. The capacitors 7 to 14 are connected on one side to the earthed negative terminal of a low voltage direct current supply (e.g. 40 volts) whilst the other sides of the capacitors are selectively connectible to the positive terminal of the supply through contacts 20 of a cam-operated change-over switch (not shown) by the movable switch contact elements 17 and 18.

The capacitor or capacitors selected by the switches 15 and 16 will thus be charged up to the full supply voltage with the contacts 20 of the change-over switch in their illustrated position. However, a few revolutions of the rods 2 before the loose end 4 of the grid wire is to be fused, the switch contacts 20 are automatically actuated in response to the operation of the switch by a cam (not shown) secured to the lathe spindle 3 or other shaft coupled thereto, thereby disconnecting the selected capacitor or capacitors from the supply and applying the capacitor voltage to the discharge electrode 6. When the loose end 4 makes contact with the electrode 6 the selected capacitor or capacitors are discharged in parallel through the loose end 4 to fuse it, a variable resistance 19 controlling the rate of discharge of the selected capacitor or capacitors. The tip of the electrode 6 is located at a distance from the axis of rotation of the grid assembly substantially equal to one half of the distance between the support rods 2 (external dimension) so that when the loose end 4 makes contact with the electrode the latter runs along the loose end until it is closely adjacent the support-rod (i.e. when the assembly is rotated through a right angle as viewed in the drawing), the rate at which the loose end is fused preferably being the same as that at which the electrode 6 moves along the loose end. If, for example, the lathe is rotating at 1500 r.p.m. and the electrode is in contact with the loose end 4 for one quarter of a revolution of the spindle 3 then the loose end must be completed in 1/100 of a second.

What we claim is:

1. The manufacture of electronic valve grids of the kind comprising a predetermined number of turns of grid wire wound on to support means by the "break and re-feed" technique, in which the loose end of grid wire formed at the commencement of each grid winding is removed by discharging charged capacitor means through said loose end to fuse the latter as it is contacted by a suitably disposed electrode during the grid winding operation in which the direction of flow of fusing current is from the electrode to the loose end of the grid wire and in which the time constant of the capacitor means discharging circuit including resistance means is substantially the same as the time during which the loose end of the grid wire is contacted by said electrode.

2. The manufacture of electronic valve grids as claimed in claim 1, in which a plurality of capacitors are charged from a relatively low voltage source and discharged in parallel through the loose end of grid wire so that the electrode potential is always at a safe value.

3. The manufacture of electronic valve grids as claimed in claim 1, in which the discharge circuit for the capacitor means includes a variable resistance for varying the time constant of said circuit according to the time during which the loose end of grid wire is in contact with the electrode and the total energy stored in said capacitor means.

4. The manufacture of electronic valve grids according to claim 1, in which the capacitor means is selected from a group of capacitors by selective switching means.

5. The manufacture of electronic valve grids according to claim 1, in which changeover switching means is automatically actuated prior to contact between the loose end of grid wire and the electrode whereby the capacitor means are disconnected from the charging source and connected to said electrode.

6. Apparatus for the manufacture of electronic valve grids according to claim 1, comprising means for rotating the grid assembly about an axis, an electrode located radially outwardly from the axis of rotation of said assembly so as to be engageable by the loose end of grid wire, capacitor means and means for charging said capacitor means, changeover switching means normally arranged for connecting said capacitor means to said charging means and operable to connect the electrically positive side of the charged capacitor means to said electrode, the electrically negative side of said charged capacitor means being connected to said loose ends of said grid wire so that said charged capacitor means discharges through said loose end of the grid wire as it engages said electrode, and resistance means connected in the discharge circuit for adjusting the time constant of said discharge circuit to a value substantially the same as the time during which the loose end is engaged by said electrode.

7. Apparatus as claimed in claim 6, in which said capacitor means comprises at least one capacitor selected from a group of capacitors by selective switching means.

References Cited in the file of this patent

UNITED STATES PATENTS

| | | |
|---|---|---|
| 1,183,264 | Woodrow | May 16, 1916 |
| 2,068,628 | Kronenwetter et al. | June 19, 1937 |
| 2,179,105 | Sidney | Nov. 7, 1939 |
| 2,508,103 | Dawson | May 16, 1950 |
| 2,853,593 | Albrecht | Sept. 23, 1958 |

FOREIGN PATENTS

| | | |
|---|---|---|
| 901,626 | France | Nov. 13, 1944 |